S. J. MARQUARDT.
HARVESTER.
APPLICATION FILED APR. 1, 1912.

1,154,037.

Patented Sept. 21, 1915.
3 SHEETS—SHEET 2.

WITNESSES:
Helen F. Glenn
Isaac N. Taylor

INVENTOR.
Samuel J. Marquardt
BY Taylor & Hulse
ATTORNEYS

S. J. MARQUARDT.
HARVESTER.
APPLICATION FILED APR. 1, 1912.
1,154,037.
Patented Sept. 21, 1915.
3 SHEETS—SHEET 3.
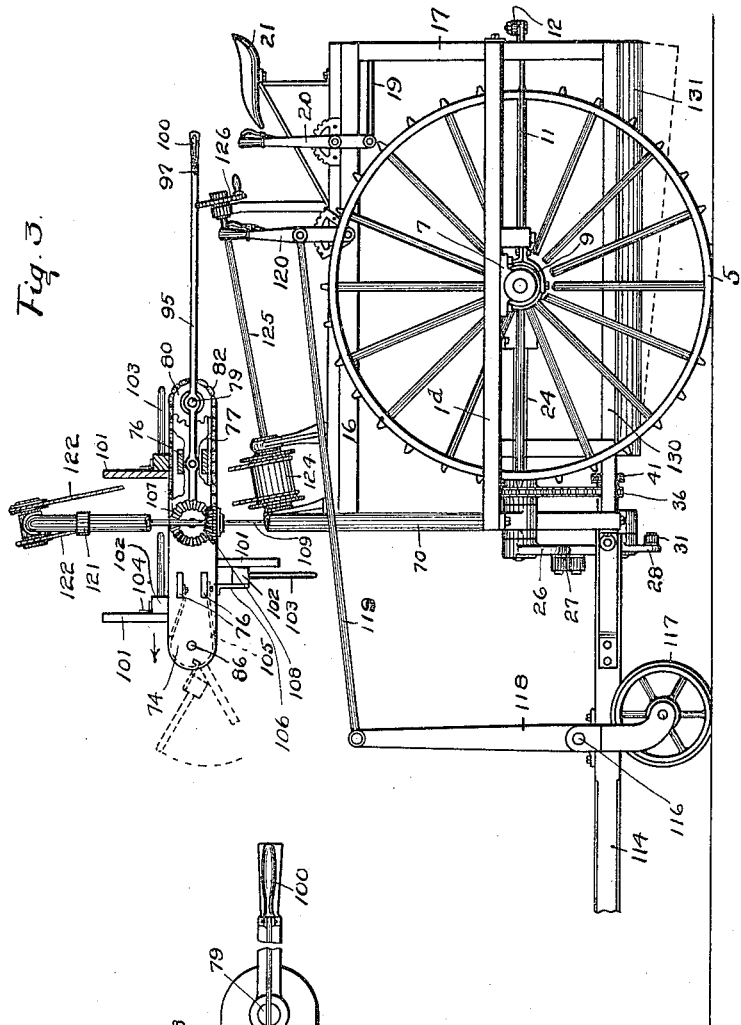
WITNESSES:
Helen F. Glenn
Isaac H. Taylor
INVENTOR.
Samuel J. Marquardt
BY Taylor & Hulse
ATTORNEYS.

UNITED STATES PATENT OFFICE.

SAMUEL J. MARQUARDT, OF MONROEVILLE, INDIANA.

HARVESTER.

1,154,037.  Specification of Letters Patent.  Patented Sept. 21, 1915.

Application filed April 1, 1912. Serial No. 687,813.

*To all whom it may concern:*

Be it known that I, SAMUEL J. MARQUARDT, a citizen of the United States, residing near Monroeville, in the county of Allen and State of Indiana, have invented new and useful Improvements in Harvesters, of which the following is a specification.

This invention relates to harvesters for grains. Its object is to provide a harvester in which the necessity of elevating the grain over the main wheel in carrying it from the rear of the cutter to the binding mechanism is done away with.

Another object is to so mount the main wheel on the frame of the machine as to eliminate side-draft.

Another object is to provide a novel construction of reel for a harvester which shall be capable of adjustment in a plurality of directions in order that the reel shall be effective on grains of various heights, and positions relatively to the ground.

Another object is to provide a construction which shall be light, of few parts and easy of operation, whereby the power required to operate the machine is materially lessened over that heretofore required, my construction also enabling me to hitch closer to the machine than has been generally possible heretofore.

With these objects in view, among others, the invention consists in the novel combination and arrangement of parts hereinafter described.

Figure 1:
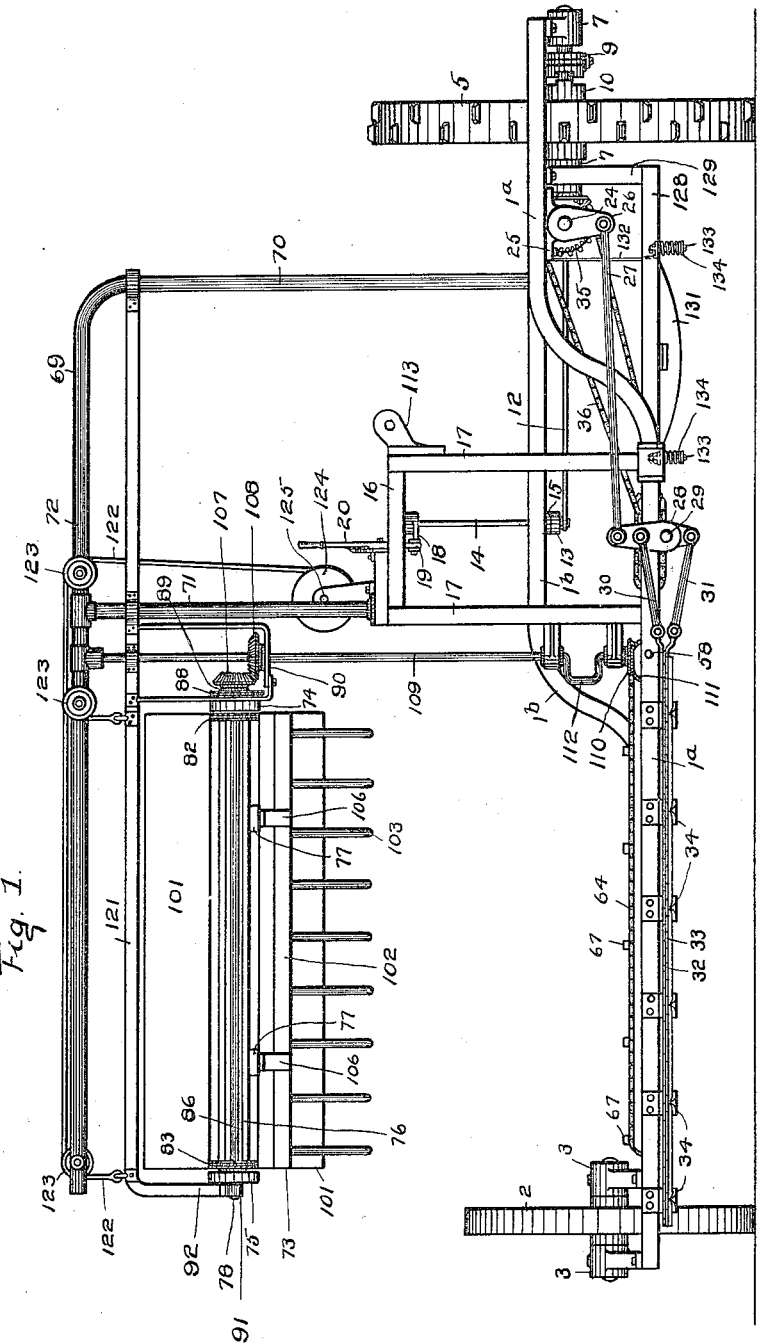
Figure 2:
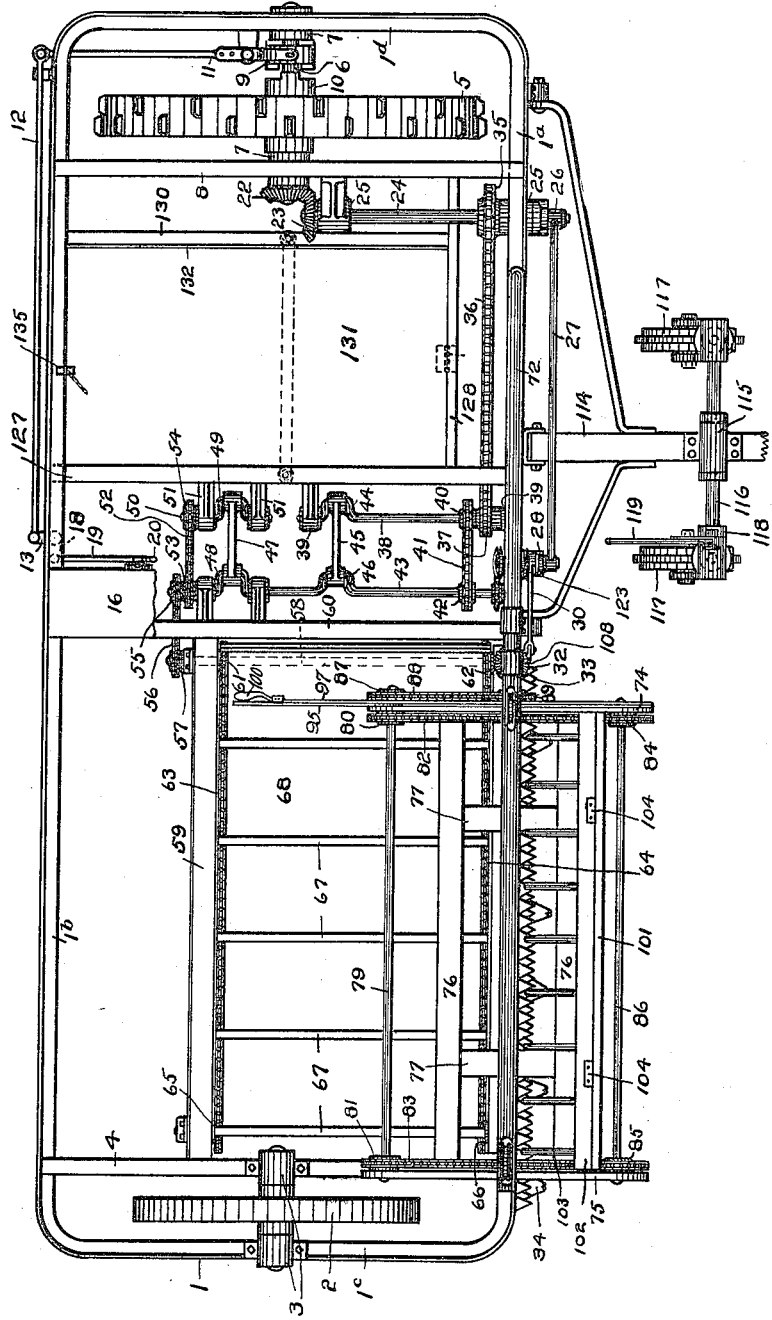

In the accompanying drawings, Figure 1 is a front elevational view of a harvester embodying my invention; Fig. 2 is a plan view of the same; Fig. 3 is a side elevation partly in section, viewed from the stubble side of the machine; and Fig. 4 is an enlarged end view of the reel, partly in section.

In carrying out my invention I mount the main wheel at one end of the main frame and the grain wheel at the opposite end, the axes of the two wheels being substantially in the same vertical plane, and the main wheel being located outside the bundle carrier so that the grain, as it is carried along by the conveyer in the rear of the cutter, travels constantly in a horizontal plane to the binder mechanism, which mechanism is between the main wheel and the cutter.

In the drawings 1 is the main frame of the machine and is composed of the members $1^a$, $1^b$, $1^c$ and $1^d$. Members $1^a$ and $1^b$ are extended upwardly toward the stubble end of the machine to accommodate the difference in diameter of the main and grain wheels, and to permit the bundles to pass from the bundle carrier without interference from the member $1^b$. The grain wheel 2 is supported by suitable bearings 3 which are secured to end member $1^c$ of frame 1 and to a cross bar 4 which is fixed to members $1^a$ and $1^b$ of the frame. At the opposite end of frame 1 I mount the main wheel 5. This wheel is loosely mounted on a revoluble axle 6 which is carried in bearings 7, which bearings are secured to end member $1^d$ of frame 1 and to a cross bar 8, which bar is secured to members $1^a$ and $1^b$ of frame 1. Slidably secured to axle 6 is a clutch member 9 which is adapted to coact with hub 10 of wheel 5 to connect said wheel to the axle. A lever 11 is operatively connected to clutch member 9 and extends rearwardly to the rear side of the frame, the rear end of the lever being connected to a rod 12, the other end of which rod is connected to a crank 13 which is secured to a vertically arranged shaft 14, which shaft is supported in a suitable bearing 15 carried by member $1^b$ of the main frame, the upper end of the shaft being supported in a suitable bearing carried by platform 16, which platform is supported on posts 17. Posts 17 are secured to members $1^a$ and $1^b$ of frame 1. A crank 18 is secured to the upper extremity of shaft 14 and is arranged at a right angle to crank 13. A link 19 is connected at one end to crank 18 and at its other end to lever 20, which is pivotally mounted on platform 16 conveniently near seat 21. By the forward movement of lever 20 the connected parts are actuated to rock lever 11 to shift clutch member 9 into connection with wheel 5.

On the inner end of axle 6 is secured a bevel pinion 22 which meshes with bevel gear 23 which is secured to shaft 24, which shaft is supported in bearings 25 carried by member $1^a$ and cross bar 8 of frame 1. A crank 26 is secured to the forward end of shaft 24 and is connected to one end of a rod 27. The other end of rod 27 is connected to the upper arm of a lever 28 which is pivotally mounted at 29 on frame 1. A link 30 is connected at one end to lever 28, the point of connection being between the pivotal point 29 and the connection between said lever and rod 27, and a link 31 is connected at one end to the other arm of lever 28, the two links being connected to the lever at equidistant points from pivot 29. The other ends of links 30 and 31 are connected respectively to cutters 32 and 33 which are adapted to reciprocate on guards or brackets 34 which depend from frame 1. The two cutters, by the oscillation of lever 28, are caused to reciprocate in opposite directions and they coact to cut the grain very efficiently, and the cutting is accomplished with considerably less operating speed of the coacting cutters than when only one cutter is used. The rotation of crank 26 oscillates lever 28 when main wheel 5 is connected to axle 6, and the machine is in operation.

In the rear of member 1ª of frame 1 is a sprocket wheel 35 which is secured to shaft 24 on which wheel is engaged a sprocket chain 36, the chain also engaging a sprocket wheel 37, which is secured to a horizontal shaft 38, which shaft is revolubly supported in suitable bearings 39 carried by frame 1 and cross bar 127, and forms part of the packers of the binder mechanism. A sprocket wheel 40 is secured to shaft 38 and is connected by chain 41 to sprocket wheel 42 which is secured to shaft 43 which is also part of the packers of the binder mechanism and is revolubly supported in suitable bearings carried by frame 1.

Shaft 38 is provided with the usual crank portion 44 to which link 45 is connected and which link is also connected to a similar crank 46 on shaft 43. A similar link 47 is connected to a second crank 48 on shaft 43 and to a crank 49 on a second shaft 50 which is supported by bearings 51 in the rear of shaft 38. In practice each of the links carries a board strip on its upper surface by which the packing is accomplished, and a board will cover the packers with the exception of the links in order that the grain may not get into the packer parts.

A sprocket chain 52 connects sprocket wheels 53 and 54 which are secured to the rear ends of shafts 43 and 50 respectively. Another sprocket wheel 55 on shaft 43 is connected by chain 56 to sprocket wheel 57 which is secured to a revoluble shaft 58, which shaft is mounted in suitable bearings carried by member 1ª and bar 59, which bar is secured to end member 1ᶜ of frame 1 and to a cross bar 60 beneath platform 16 and secured to members 1ª and 1ᵇ of frame 1. Two sprocket wheels 61 and 62 are secured to shaft 58 a suitable distance apart, on which wheels are engaged two sprocket chains 63, 64, respectively, said chains also engaging two other sprocket wheels 65, 66, respectively, which are suitably mounted on bar 59 and member 1ª of frame 1. At suitable intervals on chains 63 and 64 are secured slats or strips 67 which chains and slats form the conveyer for the grain which is thrown onto the same as the cutters sever the grain from the ground. A sheet 68, preferably of metal, is secured to bars 4, 59, 60, and member 1ª of frame 1 and is located so that the path of travel of the slats shall be a little above the upper surface of sheet 68 as the chains 63, 64 are rotated, the chains and slats passing beneath the sheet in the return movement. The sheet serves to support the grain while the slats carry it along toward the binder mechanism. The carrier just described is in the rear of the cutters and is slightly above the same.

A frame 69 is secured to main frame 1 and is preferably in the vertical plane of member 1ª of the main frame. It consists of an end upright member 70 which is secured at its lower end to member 1ª, an intermediate upright member 71 secured at its lower end to platform 16 and a horizontal member 72 which is secured to the upper ends of both the upright members. The three members of the frame are preferably formed of tubular metal.

The frame 69 serves as a support for the grain rake 73 which I will now describe. The frame of the rake consists of two parallel side boards 74 and 75, to which are secured four, or any suitable number of, cross bars or strips 76. To the lower side of the lowermost cross bars 76 are secured two bars or strips 77 which are preferably parallel to side boards 74, 75, but which terminate short of the ends of said side boards. A shaft 78 passes centrally through both side boards and serves as an axis upon which the frame may be tilted or inclined in either of two directions. A shaft 79 is revolubly mounted in the rear ends of side boards 74 and 75 and secured to said shaft, preferably adjacent the inner face of side members 74, 75 respectively, are two sprocket wheels 80, 81, which wheels are connected by chains 82, 83 to corresponding sprocket wheels 84, 85 which are secured to a shaft 86, which shaft is revolubly mounted in the forward ends of side boards 74, 75.

One extremity of shaft 79 projects through side board 74 and a sprocket wheel 87 is secured to the said projecting extremity. A sprocket chain 88 connects wheel 87 to sprocket wheel 89 which is secured to the projecting extremity of shaft 78, one arm of a bracket 90 being between the sprocket wheel 89 and the side board 74, and the shaft being borne by said arm of bracket 90 and by a bearing 91 provided in the depending extremity 92 of a bar hereafter described. The portion of bracket 90 which forms a bearing for shaft 78 (Fig. 4) is provided with a suitable number of notches 93 in any one of which a latch 94 may be engaged. Latch 94 is carried by a bar 95 which is secured to side board 74, shaft 79 passing through the bar.

A spring 96 encircles the stem 97 of the latch, one end of the spring bearing against or being connected to lug 98 which projects from bar 95 and the other end abutting a lug 99 secured to the latch. Spring 96 holds latch 94 in contact with bracket 90 and also retains it in any one of notches 93. A handle 100 at the rear end of the stem serves as a means by which the latch may be drawn out of the notch 93 in bracket 90. To tilt the frame of the rake the operator withdraws latch 94 from its engagement with the notch it may at the time engage, and he then elevates or lowers the rear end of the rake frame by the handle or bar 95. Latch 94 is then permitted to engage the notch adjacent the latch in its shifted position, and the rake is held in its tilted position.

At suitable intervals on chains 82 and 83 are secured boards 101 which are arranged on edge and span the space between the chains, and adjacent the lower edge of each board and on the same side of each board is hinged a bar or rail 102 having a number of teeth 103 projecting from one side of the same. The hinges 104 are secured to the top surface of the rail and to the adjacent surface of the board so that when board 101 is above the frame of the rake the teeth 103 will project at right angles to the board. The chains are driven in the direction of the arrow (Fig. 3) and as a board 101 passes over the sprocket wheels 84, 85, the inclination of the same causes the rail 102 and connected teeth 103 to move forwardly on the hinges until the teeth are parallel to the board. The teeth are of sufficient length to project some distance below the edge of the board.

A flexible member 105 is secured at its rear ends to forward cross bars 76 and its central portion which is bowed or expanded is arranged in the path of motion of the lower edge of board 101 as it approaches the point where it begins to tip over sprocket wheel 84. Rail 102 will strike the member 105 and be elevated thereby. This movement of the rail prior to the complete reversal of board 101 is provided in order that there shall be no sudden or abrupt flop of rail 102 on board 101 for obvious reasons.

Pins or lugs 106 are secured to each rail 102, which when the rail and board 101 are traveling forwardly project beneath the board, that is, in the opposite direction to teeth 103, and which pins, when the rail is beneath bars 77 rub on the lower surface of the bars and prevent all forward movement of the rail and teeth, when they are in contact with the grain, the teeth and rail being free to move forwardly when pins 106 pass beyond the rear ends of bars 77.

The rake is driven in the following manner: A bevel gear 107 is secured to shaft 78 or is preferably cast integral with sprocket wheel 89. Gear 107 meshes with a bevel gear 108 which is mounted on bracket 90 and is slidably keyed to shaft 109, which shaft is revolubly mounted in suitable bearings carried by member 1ᵃ and horizontal member 72 of rack 69. Near the lower end of shaft 109 is secured a bevel gear 110 which meshes with a bevel gear 111 secured to shaft 58. A crank 112 on shaft 109 is adapted to be connected to the usual butter (not shown) of the binding mechanism. The remaining portions of the binding mechanism may be attached to brackets 113 which are carried on posts 17 or platform 16.

Rake 73 is adjustable in a vertical direction on shaft 109 and is supported in the following manner: A bar 121 is slidably mounted on shaft 109 and on uprights 70 and 71 of frame 69, the grain end of the bar being bent downwardly or provided with a downward extension 92 in the lower end of which the rake is supported, bracket 90 being also secured to said bar. At suitable points on said bar I connect two cables 122 which pass upwardly and over idler pulleys 123 which are mounted on frame 69, and then downwardly to a drum 124 to which they are connected. Said drum is secured to a shaft 125 which is revolubly mounted on platform 16, and extends rearwardly, its rear end carrying a hand wheel 126 by which the shaft and drum may be rotated to wind or unwind the cables and thereby raise or lower the rake. At a suitable point on tongue 114, preferably as close as possible to its inner end, where it is suitably connected to frame 1, I secure a suitable bearing 115 in which is revolubly mounted a transverse rod or axle 116. At the opposite extremities of rod 116 are mounted caster wheels 117 which roll on the ground in operation. At a suitable point on rod 116 or to the frame of one of the caster wheels, I secure one end of an upwardly extending crank 118. A rod 119 is pivotally connected to the upper end of the crank and extends rearwardly, the rear end thereof being pivoted to a lever 120 which is pivotally mounted on platform 16, conveniently for operation from seat 21. By forcing lever 120 forwardly lever 118 is rocked forwardly causing wheels 117 to move rearwardly thereby permitting the tongue and the forward portion of the machine to drop downwardly for the purposes of operation when desired. The wheels 117 take care of the weight of the tongue and mechanism irrespective of the position of the tongue relatively to the ground, consequently the weight of the tongue and mechanism is removed from the neck of the horses and obviates the injury to such animals heretofore caused by such weight.

Cross bar 127 is secured at one end to member 1ª and is substantially in the horizontal plane of the grain end of member 1ª of frame 1, an upright serving to support the opposite end of the bar from member 1ᵇ. A bar 128 is secured at one end to bar 127 and to an upright 129 which is secured at its upper end to cross bar 8, and a bar 130 parallel to bar 127 and in the same horizontal plane is suitably carried by bar 128 and member 1ᵇ. Hinged at its forward end to bar 128 is the bundle carrier 131 which extends from bar 128 to the rear side of the machine and between cross bars 127 and 130. On the stubble side of the carrier 131 is secured a vertically arranged guard 132 to prevent the bundles from falling off the carrier laterally or getting into the mechanism at the grain end of the machine. Depending from bars 127 and 130 and at suitable points thereon are two rods 133 each of which carries a coiled spring 134. Carrier 131 is suitably connected to the springs, which springs are of suitable strength to hold up the weight of the carrier. Suitable means 135 for releasably locking the carrier in its normal horizontal position will be provided so that when the bundles are delivered to the carrier from the binder mechanism the weight of the same will not cause the carrier to tilt downwardly on its hinge until the discharge of the bundles is desired by the operator. When a number of bundles have collected on the carrier the operator may permit the carrier to tilt downwardly permitting the bundles to slide off the carrier onto the ground in the rear of the machine. When the bundles are discharged springs 134 restore the carrier to its normal position. The carrier is made in such width that a considerable number of bundles may be deposited upon it before a discharge of the same on to the ground is necessary.

It is apparent that the construction above described is exceedingly simple, of few parts and easy of operation and control. The rotation of the main wheel 5, when connected to axle 6, causes the knives to reciprocate in opposite directions; it drives the packers which in turn drive the grain carrier and the grain rake. By the rotation of drum 124 the grain rake may be lowered or raised any desired distance according to the height of the grain. It may be lowered and tilted so that teeth 103 will pick up grain which is down on the ground, and convey the same onto the grain carrier. There is no part of the conveyer web to be injured by the elements, the grain is carried in a straight line from the time it falls onto the carrier until it reaches the binder mechanism from which the bundles of grain are delivered to the grain carrier and by it to the ground in the rear of the machine. The main wheel 5 is wholly outside the binder mechanism and bundle carrier and by its position all side draft on the machine as it is being operated is obviated, and by the use of the tilting device on the tongue the weight of and on the tongue is removed from the necks of the animals pulling the machine. The team may also be hitched very close to the main frame since there is no part of the device which projects far from the forward side of frame 1. The lightness of the few parts of the machine and the absence of side draft make it very light running so that less horse power is required to operate it than heretofore.

Numerous modifications in construction of the parts are evident, hence, I do not wish to be limited to the precise constructions described and illustrated.

What I claim is:

1. In a harvester, the combination with a main frame, of an upright frame secured to the main frame and including a pair of parallel vertically disposed guide bars, and a connecting bar having one end projecting beyond the guide bars, a sliding frame mounted on and guided by the vertical bars, a reel journaled in said sliding frame beneath the end of the connecting bar and means supported from the projecting end of the connecting bar to raise and lower the sliding frame.

2. In a harvester, the combination with a main frame, of an upright frame secured to the main frame and including a pair of parallel vertically-disposed guide bars, and a connecting bar having one end projecting beyond the guide bars, a sliding frame mounted on and guided by the vertical bars and extending beneath the projecting end of the connecting bar, a reel journaled in said sliding frame beneath said projecting end of the connecting bar, a winding drum mounted on the main frame, idler pulleys mounted on the vertical frame, two of the pulleys being located over respective ends of the reel, and hoisting ropes trained over said pulleys and each connected at one end to the sliding frame and at the other end to the reel.

3. In a harvester, a main frame, a vertical frame including a pair of vertical members and a cross member overhanging the vertical members at one end, a sliding frame mounted on and having a portion located beneath the over-hanging end of the cross member and guided by the vertical members, a reel journaled in the sliding frame beneath the over-hanging end of the cross-member, a stirrup depending from the sliding frame and having the reel journaled therein in one side thereof, a driving shaft extending through the stirrup and sliding frame, a beveled gear fixed to the reel within the stirrup and a second beveled gear supported on the bottom of the stirrup and meshing with the first beveled gear, the second gear being splined to the driving shaft.

In witness whereof I have hereunto signed my name in the presence of two witnesses this 27th day of March, 1912.

SAMUEL J. MARQUARDT.

Witnesses:
 HELEN F. GLENN,
 ELWIN M. HULSE.

Copies of this patent may be obtained for five cents each, by addressing the "Commissioner of Patents, Washington, D. C."